United States Patent [19]
Hsieh

[11] Patent Number: 5,553,502
[45] Date of Patent: Sep. 10, 1996

[54] CAPACITIVE PRESSURE SENSOR WITH EXTRUDED INDIUM VACUUM SEAL

[75] Inventor: Youfong Hsieh, Camarillo, Calif.

[73] Assignee: Kavlico Corporation, Moorpark, Calif.

[21] Appl. No.: 362,656

[22] Filed: Dec. 22, 1994

[51] Int. Cl.$^6$ .............................. G01L 9/12; B23K 20/02
[52] U.S. Cl. ...................... 73/724; 361/283.4; 29/25.41; 228/124.6
[58] Field of Search ....................... 29/25.41; 361/283.4; 73/718, 724; 228/124.6

[56] References Cited

U.S. PATENT DOCUMENTS

| | | | |
|---|---|---|---|
| 5,173,836 | 12/1992 | Tomase et al. | 73/724 X |
| 5,197,653 | 3/1993 | Beckwith et al. | 228/124.6 X |
| 5,275,054 | 1/1994 | Park . | |
| 5,329,819 | 7/1994 | Park et al. . | |
| 5,349,865 | 9/1994 | Kavli et al. . | |
| 5,349,867 | 9/1994 | Park . | |

OTHER PUBLICATIONS

Jones, E. A., et al., "On Indium Seals in Low Temperature Devices", *Cryogenics*, Apr. 1972, pp. 135–136.
Turkington, R. R., et al., "Note on the Design of Simple Indium O-ring Seals", *Rev. Sci. Instrum.*, vol. 55, No. 5, May 1984, pp. 803–805.
Mills, G. L., et al., y "Cold Assembly of Leak Tight Demountable Joints", *Advances in Cryogenics Engineering*, vol. 31, pp. 951–955.
Bauman, J. T., et al., "Indium Caulking Technique for Vacuum Seal", *The Journal of Vacuum Science and Technology*, vol. 17, No., 3, Dec. 1969, pp. 462–463.
Saeki, H., et al., "Optical Window Sealed with Indium for Ultrahigh Vacuum", *Vacuum*, vol. 39, No. 6, (1989), pp. 563–564.
Klomp, J. T., et al., "Parameters in Solid–State Bonding of Metals to Oxide Materials and the Adherence of Bonds", *Journal of Materials Science*, vol. 15, Jul. 20, 1980, pp. 2483–2488.
Lee, P. S. C., et al., "Leak Tight Vacuum Seals for Large Windows and Flanges at Liquid Helium Temperatures", *Cryogenics*, (1981), pp. 623–625.
Neuhauser, R. G., "Pressure–Made Safe–Metal Vacuum Seals for glass and Ceramics", *Vacuum*, vol. 29, No. 6/7, Feb. 1979, pp. 231–235.

*Primary Examiner*—Richard Chilcot
*Assistant Examiner*—Joseph L. Felber
*Attorney, Agent, or Firm*—Poms, Smith, Lande & Rose

[57] ABSTRACT

A capacitive pressure sensor has a plate and a diaphragm formed of alumina and hermetically sealed in a spaced relationship, thereby defining a chamber therebetween. Conductive layers are formed on the plate and the diaphragm in opposition. An evacuation passage is formed through the plate such that the chamber pneumatically communicates with the outside. A recess is formed in an outer portion of the evacuation passage, and a tapered throat is formed in an inner portion of the evacuation passage. The chamber is substantially evacuated, and the evacuation passage is hermetically sealed by placing an indium chip and then an alumina plug in the recess. The plug is forced against the indium chip, thereby extruding indium down into the throat and up into the recess around the plug. By extruding the indium, the indium chip is plastically deformed, thereby exposing unoxidized indium to the alumina of the plate and the plug. An oxidation reduction reaction occurs and forms a chemical bond. A method for sealing the capacitive pressure sensor includes the steps of forming the recess in the outer portion of the evacuation passage, evacuating the chamber, and extruding indium down into the inner portion of the evacuation passage and up into the recess around the plug by forcing the plug against the indium chip.

16 Claims, 3 Drawing Sheets

5,553,502

CAPACITIVE PRESSURE SENSOR WITH EXTRUDED INDIUM VACUUM SEAL

FIELD OF THE INVENTION

The present invention relates to capacitive sensors and, more particularly, to a capacitive pressure sensor having an evacuated chamber hermetically sealed with indium. The invention further relates to a method for hermetically sealing a capacitive pressure sensor.

BACKGROUND OF THE INVENTION

Pressure sensors are widely used in applications ranging from commercial and tactical aircraft to aerospace and automotive vehicles. Pressure sensors are typically incorporated into transducers for use in various control systems for aircraft and vehicles, particularly flight and servo controls, engine and fuel controls, thrust vectoring, and force feedback. Because of these varied applications, the pressure sensors must operate under adverse conditions such as temperature and pressure extremes, vibration, and so on.

Capacitors in general consist of a pair of oppositely-charged conductive plates in a spaced relationship. The medium occupying the area between the plates is called the dielectric, which is generally a nonconductive material such as ceramic or simply air. The value or capacitance of the capacitor depends upon several variables, including the type of dielectric, the surface area of the plates, and the distance between the plates. Therefore, if any of these variables change, the capacitance of the capacitor changes accordingly. Generally speaking, a capacitive sensor is constructed so that the area of the plates does not change, and the medium between the plates (the dielectric) does not change; only the distance between the plates changes. As capacitance is inversely proportional to the distance between the plates, capacitance increases as distance decreases.

In order to measure a change in pressure with a capacitive sensor, at least one of the plates is flexible or deflectable, such that if there is a change in pressure, the force on the outside of the deflectable plate increases or decreases, thereby deflecting the plate and therefore changing the distance between the plates. Accordingly, capacitance changes.

To determine the pressure change, capacitance is continuously measured in the sensor. If the capacitance increases, the change in distance which caused the increase in capacitance is calculated based on known values. Furthermore, the increase in force required to cause the plate to flex the calculated distance is then determined, from which the magnitude of the pressure increase is determined. A capacitive sensor incorporating this principle has been disclosed by U.S. Pat. No. 4,425,799, which was granted on Jun. 14, 1983, and is assigned to the assignee of the present invention.

In order for the capacitive pressure sensor to reliably operate in certain critical applications, the chamber between the plates is often evacuated. If air were present within the chamber and the sensor were to operate at high or low temperatures (e.g., 150 degrees celsius or −40 degrees celsius), the air would accordingly expand or contract, thereby exerting an internal force on the deflectable plate and lessening the accuracy of the sensor. Accordingly, the chamber must be hermetically sealed to ensure that the vacuum within the chamber is maintained over time. Evacuating the chamber between the plates also yields more favorable capacitance values for the sensor.

Methods are present in the related art for hermetically sealing evacuation passages formed in capacitive sensors. These methods typically entail numerous steps, including metallizing the surfaces, firing with thick films such as palladium or gold, adding flux, soldering, evacuating, and heating for a length of time to ensure that a substantially hermetic bond has formed. This process is not only time consuming and expensive but also demands highly-specialized manufacturing conditions in order to maintain quality control standards.

Therefore, there is a need in the art for a capacitive pressure sensor with a relatively easily-formed hermetic seal. Furthermore, there is a need for a method for sealing an evacuation passage in a capacitive pressure sensor in an easy, reliable, and cost-effective manner.

SUMMARY OF THE INVENTION

In accordance with an illustrative preferred embodiment of the present invention, a capacitive sensor is provided with an evacuated dielectric chamber and an extruded hermetic indium seal. The sensor comprises a plate and a diaphragm hermetically and annularly sealed by means of a frit seal, thereby defining a chamber within the sensor. The plate and the diaphragm have respective conductive layers disposed in opposition on inside surfaces thereof, such that the chamber serves as the dielectric. Furthermore, the plate and the diaphragm are formed of alumina. More specifically, an evacuation passage is formed through the plate, therefore allowing pneumatic communication of the chamber with the outside. A recess is formed in an outer portion of the evacuation passage, thereby defining a throat in an inner portion of the passage. The throat is tapered from the bottom of the recess to the chamber.

After the chamber is substantially evacuated, the evacuation passage must be sealed. To do so, a chip of indium is place in the bottom of the recess. A plug, having substantially the same configuration as the recess, is then placed in the recess. A pressure ram or like means subsequently forces the plug against the indium, therefore extruding indium down into the throat and up into the recess around the plug and exposing unoxidized indium to the oxygen of the plate and the plug. It has been found that other metal such as lead are extrusile but that indium is most desirable in terms of qualities such as ductility.

It has been found that by exposing unoxidized indium to oxides (such as alumina) that an oxidation reduction reaction occurs therebetween, thereby forming a chemical bond. This bond is believed to be desirable in hermetically sealing the evacuation passage and the chamber. Furthermore, by tapering the throat inward, there is a greater normal force between the indium and the walls thereof and a greater plastic deformation of the indium, such that the formation of a sealing bond is further facilitated.

Another aspect of the present invention is to provide a method for hermetically sealing a capacitive pressure sensor with an evacuated dielectric chamber. The method teaches the steps of forming a recess in the outer portion of the evacuation passage and tapering a throat in the inner portion of the evacuation passage. The method further teaches extruding indium in the passage at room temperature by means of a plug being forced against a chip of indium placed at the bottom of the recess. By forcing the plug against the indium chip, the indium undergoes plastic deformation, thereby exposing unoxidized indium to the oxides of the plate (walls of the evacuation passage) and the plug and inducing an oxidation reduction reaction; therefore, a chemical bond is formed, and the chamber is hermetically sealed.

Additional advantages and novel features of the present invention will become apparent to those skilled in the art upon examination of the following detailed description and attached drawings.

DETAILED DESCRIPTION OF THE PREFERRED EMBODIMENTS

Figure 1:
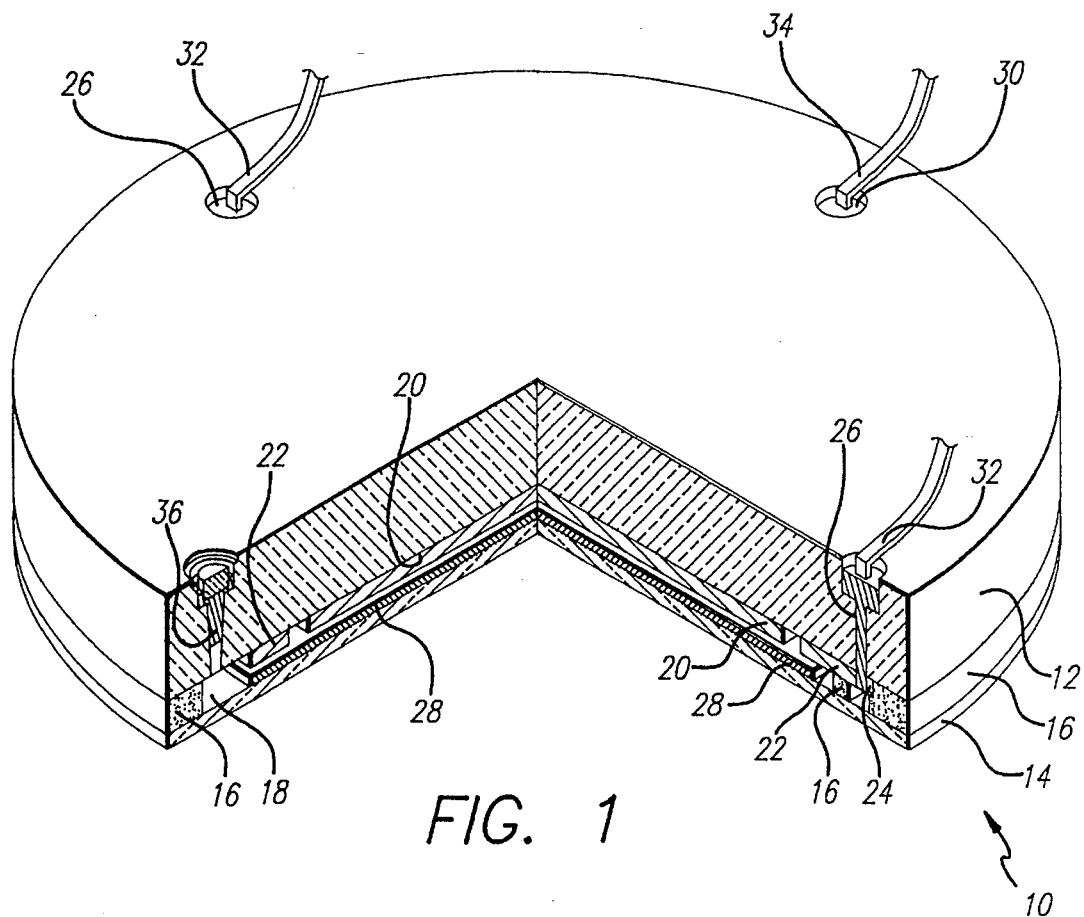
FIG. 1 is a perspective view of a capacitive sensor shown with a portion thereof cut away, illustrating the principals of a preferred embodiment of the present invention.

Referring to the drawings, particularly to FIG. 1, a capacitive sensor 10 according to a preferred embodiment of the present invention is shown. The sensor 10 generally comprises an plate 12 and a diaphragm 14. The plate 12 and the diaphragm 14 are substantially circular and made from a nonconductive material such as alumina ($Al_2O_3$), silica, or the like. An annular frit seal 16 is disposed between the plate 12 and the diaphragm 14, thereby forming a dielectric chamber 18 therebetween. The plate 12 is sufficiently thick so as to be inflexible under specified operating pressures, and the diaphragm 14 is sufficiently thin so as to be deflectable or flexible when experiencing a change in specified operating pressures. Incidentally, the thickness of the diaphragm 14 has been exaggerated in FIG. 1 for the purpose of clarity.

Figures 2, 3:
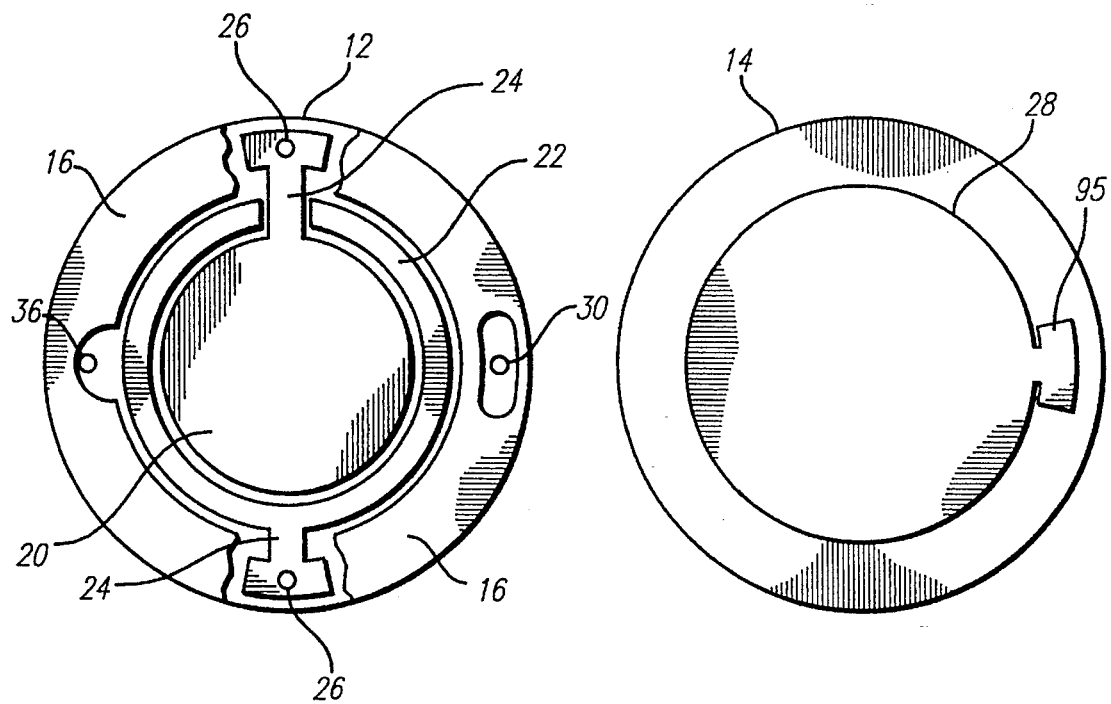
FIG. 2 is a plan view of a lay out of conductive layers of the capacitive sensor.
FIG. 3 is a view similar to FIG. 2, showing another conductive layer of the capacitive sensor.

With additional reference to FIG. 2, the plate 12 has a central conductive layer 20 and an annular conductive layer 22 disposed on the inner side thereof. The annular conductive layer 22 substantially but not totally encircles in a spaced relationship the central conductive layer 20, such that the conductive layers 20 and 22 are insulated from the respective other. Each of the conductive layers 20 and 22 has a strip contact 24 leading therefrom to a respective lead passage 26 formed through the plate 12.

With additional reference to FIG. 3, the diaphragm 14 has a conductive layer 28 disposed on the inner side thereof. The diameter of the conductive layer 28 is such that the lower conductive layer 28 of the diaphragm 14 is opposed to all areas of the conductive layers 20 and 22 of the plate 12. It should be known that the conductive layers 20, 22, and 28 are substantially films and that the thicknesses thereof have been exaggerated in the drawings for clarity.

With further reference to FIG. 2, a ground passage 30 is formed through the plate 12. The ground passage 30 is positioned in the plate 12 such that the conductive layer 28 of the diaphragm 14 is opposed thereto. Particularly referencing FIG. 1, a pair of conductive leads 32 are respectively received in the lead passages 26. The leads 32 are anchored in the lead passages 26 by means of a conductive solder such that the leads 32 are electrically connected to the conductive layers 20 and 22, respectively. Similarly, a ground lead 34 is received in the ground passage 30. The ground lead 34 is anchored in the ground passage 30 by means of a conductive solder such that the ground lead 34 is electrically connected to the conductive layer 28 of the diaphragm 14. It may be noted that the frit seal 16 hermetically seals the sensor 10, including the area around the passages 26 and 30, which is a known art.

For completeness, reference is made to U.S. Pat. No. 4,425,799, granted on Jun. 14, 1983, and assigned to the assignee of the present invention, which discloses and describes in some detail capacitive sensors of the type shown in FIGS. 1–3 of the present invention.

Figure 4:
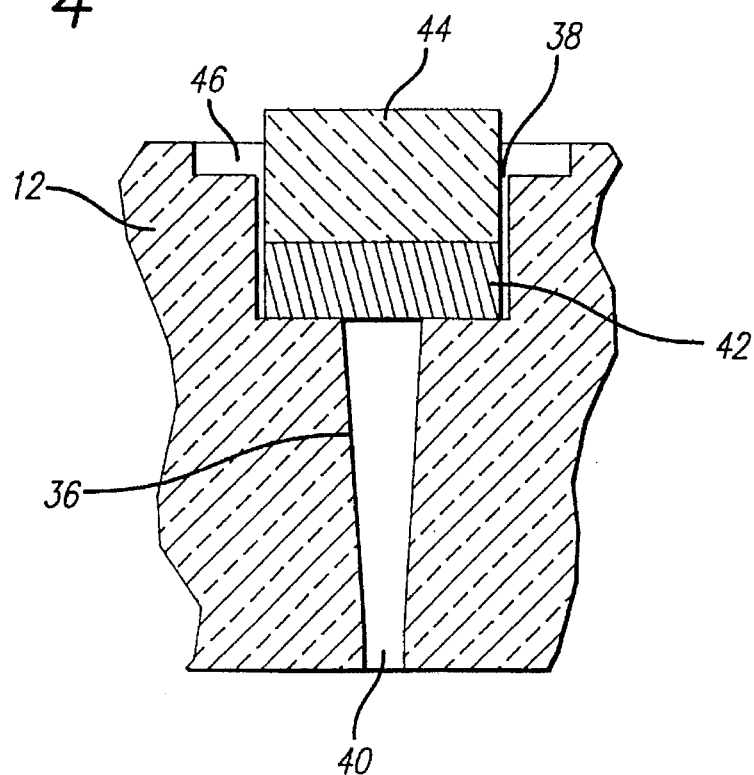
FIG. 4 is a cross-sectional view of an evacuation passage and sealing means of the capacitive sensor, showing the evacuation passage prior to sealing.
Figure 5:
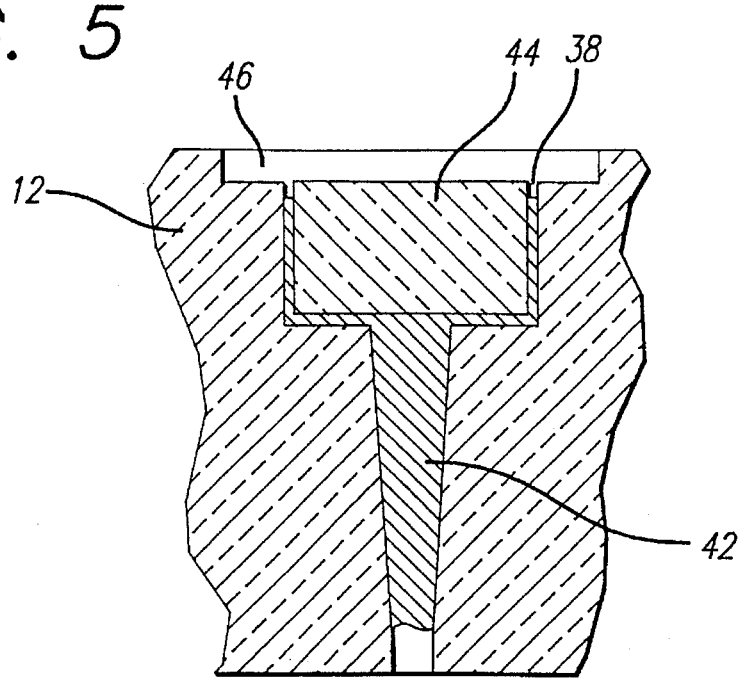
FIG. 5 is a view similar to FIG. 4, showing the evacuation passage after sealing.

With continued reference to FIG. 1 and specific reference to FIGS. 4 and 5, an evacuation passage 36 is formed through the plate 12, thereby providing pneumatic communication from the chamber 18 to the outside of the plate 12. A recess 38 is formed in an outer portion of the evacuation passage 36, thereby defining a throat 40 in an inner portion thereof. The throat 40 is tapered toward the inner side of the plate 12. A countersink 46 may also be formed in the outside surface of the plate 12, encircling the recess 38.

The evacuation and hermetical sealing of the sensor 10 will now be considered. After the chamber 18 is evacuated to a desired level, a vacuum seal hermetically seals the evacuation passage 36. More specifically, an indium chip 42 is inserted into the recess 38, such that the top of the throat 40 is substantially covered, as shown in FIG. 4. A plug 44 is then inserted into the recess 38. The plug 44 has substantially the same configuration as the recess 38. Furthermore, the diameter and the axial thickness of the plug 44 are slightly less than the respective dimensions of the recess 38. It should be known that other soft or extrusile metals may be suitably used in place of indium, depending upon the application and operating conditions of the sensor.

The plug 44 is then pushed down into the recess 38 against the indium chip 42 by means of a pressure ram or the like, causing the indium seal 42 to be forced down into the throat 40 and up into the recess 38 around the plug 44, as shown in FIG. 5, thereby filling the throat 40 and the space between the plug 44 and the recess 38 with indium. By extruding the indium chip 42 in this way, the indium undergoes plastic deformation, thereby exposing unoxidized indium to the alumina, specifically oxygen thereof, of the walls of the recess 38, the throat 40, and the plug 44. By tapering the throat 40, the normal forces between the walls of the throat 40 and the indium chip 42 as the latter is being extruded are greater than if the throat 40 were not tapered; therefore, the seal and intimate bonding is further facilitated.

As can be seen, the volume of the indium chip 42 is slightly less than the volumetric difference of the evacuation passage 36 less the plug 44, thereby eliminating the overuse of indium. As it has been found that indium may corrode over time from exposure to certain chemicals that may be found in the atmosphere or in adverse operating environments, the countersink 46 may be filled with a sealant of epoxy, polymer, or the like (not shown) for a protective finish.

As the plate 12 and the plug 44 are made from a composition of alumina and silica, e.g., 96% $Al_2O_3$ and 4% glass (which also contains oxygen), an oxidation reduction reaction may take place, and a chemical bond may form between the indium chip 42 and the walls of the evacuation passage 36 and between the indium chip 42 and the plug 44, thereby vacuum or hermetically sealing the chamber 18. It has been found that this bond is substantially hermetic, thereby sealing the chamber 18 in an evacuated state. It has further been found that the bond is able to form at room temperature, thereby eliminating the requirement of applied heat in the process. In addition, a force of approximately 100 pounds substantially extrudes the indium chip 42 in the described embodiment. With the radius of the plug 44 being approximately 0.035 inch, this 100-pound force corresponds to approximately 26,000 pounds per square inch.

It should be noted that the chamber 18 may be evacuated with the indium chip 42 and the plug 44 placed in the recess 38, as shown in FIG. 3. As the indium chip 42 may be slightly irregular in shape and smoothness, air inside the chamber 18 is able to escape through the throat 40 and around the indium chip 42 through the recess 38. Furthermore, the chamber 18 can be pumped down to a desired level within an order of approximately 10 seconds through the small gaps between the indium chip 42 and the bottom of the recess 38.

In order to realize a specific embodiment of the pressure sensor 10 according to the present invention, dimensions of a sample units for use in an automobile will be provided. For example, the diameter of the plate 12 and the diaphragm 14 is approximately 1 1/4 inches; the thickness of the plate 12 is approximately 1/8 inch; the thickness of the diaphragm 14 is 1/50 inch; and the thickness of the frit seal 16 is about one mil to two mils. Initial capacitance of such a sensor may be 55 picofarads to 75 picofarads. Defining another sample, the diameter of the plate 12 and the diaphragm 14 is approximately 4/5 inch; the thickness of the plate 12 is approximately 1/6 inch; the thickness of the diaphragm 14 may range from about 11 mils to more than 100 mils for operating pressures of 15 pounds/inch$^2$ to more than 6,000 pounds/inch$^2$, respectively. Initial capacitance of such a sensor may be 30 picofarads to 50 picofarads.

Figure 6:
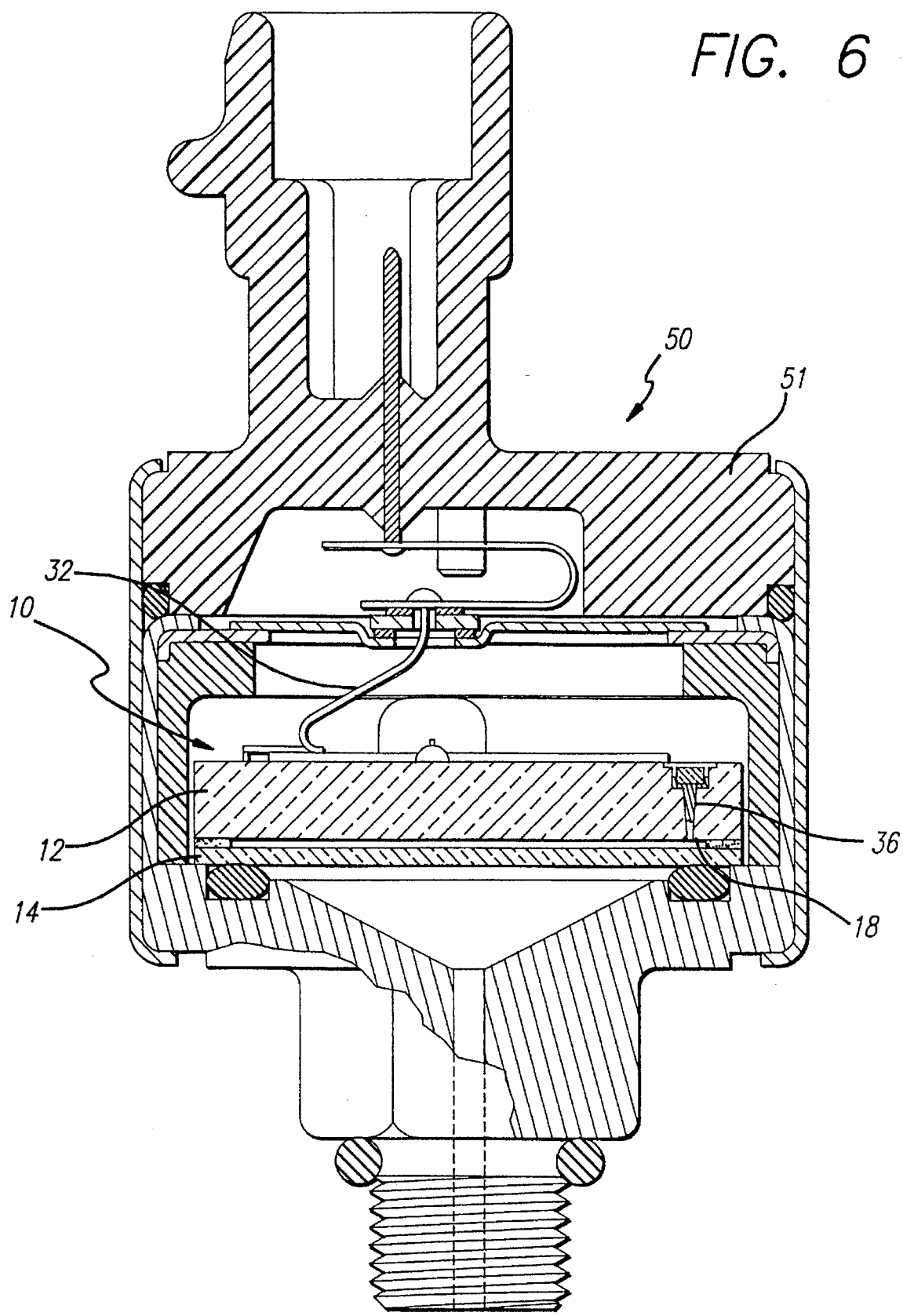
FIG. 6 is a partial cross-sectional view of a transducer according to a preferred embodiment of the present invention.

Referring to FIG. 6, the capacitive pressure sensor 10 is shown in a preferred applicable embodiment in a transducer unit 50, including a housing 51 formed of a high-strength plastic. The sensor 10 is received within the body of the transducer unit 50 and has the leads 32 communicating with electronics thereof. When there is a change in pressure, the diaphragm 14 flexes accordingly, therefore changing the distance between the conductive plates (cf. FIG. 1), such that the capacitance changes. The magnitude of the change in capacitance then produces a corresponding change in the output voltage indicating the pressure.

The present invention also teaches a method for hermetically sealing the chamber in an evacuated state, preferably at room temperature and without involving time-consuming steps. The method comprises the steps of forming the recess 38 in the outer portion of the evacuation passage 36, thereby defining the throat 40 in the inner portion of the evacuation passage 36. Indium is then extruded into the evacuation passage 36 by placing the indium chip 42 in the bottom of the recess 38 and then forcing the plug 44 against the indium chip 42 with a pressure ram or the like, preferably with of a force of approximately 100 pounds. This force plastically deforms the indium chip 42 so that unoxidized indium contacts the alumina of the plate 12 and the plug 44, thereby hermetically sealing the chamber 18.

In this disclosure, there is shown and described only the preferred embodiment and method of the capacitive pressure sensor according to the present invention, but, as aforementioned, it is to be understood that the invention is capable of use in various other combinations and environments and is capable of changes or modification within the scope of the inventive concept as expressed herein.

What is claimed is:

1. A capacitive pressure sensor, comprising:

a plate having a conductive layer on one side thereof;

a diaphragm having a conductive layer on one side thereof and being closely spaced from and sealed to said plate, thereby forming a chamber therebetween;

said plate and said diaphragm being formed of alumina, said conductive layers being in opposition, and said chamber being substantially evacuated;

said plate having a recess in the surface thereof oriented away from said diaphragm;

said plate having an evacuation passage extending from the bottom of said recess to said chamber, said evacuation passage being tapered;

a plug formed of alumina and having substantially the same configuration as said recess; and extruded indium hermetically sealing said plug in said recess, said indium extending into said evacuation passage and around the adjacent interface between said plug and said recess;

whereby said chamber may be evacuated and sealed at room temperature by mechanically forcing said plug into said recess with some indium at the bottom of said recess.

2. A capacitive pressure sensor, comprising:

a plate formed of nonconductive material and having a conductive layer on one side thereof;

a diaphragm formed of nonconductive material and having a conductive layer formed on one side thereof, said conductive layers being in opposition;

an annular hermetic seal disposed between said plate and said diaphragm and defining a chamber therebetween;

a passage formed through said plate and having a recess formed in an outer portion thereof;

a plug being receivable in said recess; and a extrusile metal seal substantially extruded in said passage and around said plug in said recess;

whereby said chamber may be sealed by mechanically forcing said plug against a chip of extrusile metal placed at the bottom of said recess, thereby forcing metal down into an inner portion of said passage and up around said plug in said recess.

3. A capacitive pressure sensor as claimed in claim 2, wherein said passage is tapered from the bottom of said recess to said chamber.

4. A capacitive pressure sensor as claimed in claim 2, wherein said extrusile metal is indium.

5. A capacitive pressure sensor as claimed in claim 2, wherein said plate, said diaphragm, and said plug are formed of alumina.

6. A capacitive pressure sensor as claimed in claim 2, wherein said plate, said diaphragm, and said plug are formed of a composition of approximately 96% Aluminum oxide and 4% glass.

7. A capacitive pressure sensor as claimed in claim 2, wherein said chamber is substantially evacuated.

8. A capacitive pressure sensor as claimed in claim 2, wherein said plug has substantially the same configuration as said recess.

9. A capacitive pressure sensor as claimed in claim 2, wherein the volume of said chip of extrusile metal is slightly less than the volumetric difference of said passage and said recess less said plug.

10. A method for hermetically sealing a capacitive pressure sensor comprising a plate formed substantially of alumina and having a conductive layer on one surface thereof and an evacuation passage formed therethrough, a diaphragm formed substantially of alumina and having a conductive layer on one surface thereof facing said conductive layer of said plate, and an annular hermetic seal defining a chamber between said plate and said diaphragm, comprising the steps of:

forming a recess in an outer portion of said evacuation passage; and extruding indium in into said recess and said evacuation passage.

11. A method as claimed in claim 10, wherein said extruding step comprises the steps of:

placing a chip of indium in said recess; and forcing a plug down into said recess against said chip of indium;

whereby indium is extruded down into an inner portion of said passage and up into said recess around said plug.

12. A method as claimed in claim 11, wherein said plug is forced down into said recess with a force of approximately 100 pounds.

13. A method as claimed in claim 10, further comprising the step of evacuating said chamber prior to said extruding step.

14. A method as claimed in claim 10, wherein said steps take place at room temperature.

15. A method as claimed in claim 10, further comprising the step of tapering said passage from the bottom of said recess to said chamber, prior to said extruding step.

16. A method as claimed in claim 10, wherein said extruding steps comprises the steps of:

placing a chip of indium in the bottom of said recess; and forcing a plug down into said recess against said chip of indium, said plug being formed of alumina and having substantially the same configuration as said recess;

whereby indium is extruded up into said recess around said plug and down into an inner portion of said evacuation passage.

\* \* \* \* \*